(12) United States Patent
Lu et al.

(10) Patent No.: US 10,862,770 B2
(45) Date of Patent: Dec. 8, 2020

(54) NF SERVICE CONSUMER RESTART DETECTION USING DIRECT SIGNALING BETWEEN NFS

(71) Applicant: Telefonaktiebolaget LM Ericsson (publ), Stockholm (SE)

(72) Inventors: Yunjie Lu, Shanghai (CN); Wenliang Xu, Shanghai (CN); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/345,153

(22) PCT Filed: Nov. 14, 2018

(86) PCT No.: PCT/CN2018/115426
§ 371 (c)(1),
(2) Date: Apr. 25, 2019

(87) PCT Pub. No.: WO2019/210675
PCT Pub. Date: Nov. 7, 2019

(65) Prior Publication Data
US 2020/0153707 A1    May 14, 2020

(51) Int. Cl.
*H04W 24/04* (2009.01)
*H04L 12/24* (2006.01)
*H04L 29/08* (2006.01)

(52) U.S. Cl.
CPC ...... *H04L 41/5012* (2013.01); *H04L 41/0654* (2013.01); *H04L 41/5025* (2013.01);
(Continued)

(58) Field of Classification Search
CPC ............ H04W 28/0268; H04W 28/10; H04W 36/0022; H04W 4/021; H04W 4/70;
(Continued)

(56) References Cited

U.S. PATENT DOCUMENTS 10,116,514 B1 * 10/2018 Felstaine ............. H04L 41/0695
10,631,357 B2 *  4/2020 Park ...................... H04W 80/10
(Continued)

FOREIGN PATENT DOCUMENTS

EP    WO2020030275    *  2/2020    ............ H04L 41/00
WO      2012095492 A1     7/2012
(Continued)

OTHER PUBLICATIONS

Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.
(Continued)

*Primary Examiner* — Jean A Gelin
(74) *Attorney, Agent, or Firm* — Withrow & Terranova, PLLC (57) ABSTRACT

Systems and methods for detecting, that a Network Function (NF) service consumer in a core network of a cellular communications system has restarted are disclosed. A method of operation of a NF service consumer in a core network of a cellular communications system comprises sending, to a NF service producer, a message comprising information related to a unit of the NF service consumer.

20 Claims, 7 Drawing Sheets

(52) U.S. Cl.
    CPC ...... *H04L 41/5032* (2013.01); *H04L 41/5038* (2013.01); *H04L 67/322* (2013.01); *H04W 24/04* (2013.01)

(58) Field of Classification Search
    CPC ... H04W 60/00; H04W 64/006; H04W 68/00; H04W 68/005; H04W 68/02; H04W 84/12; H04W 24/04; H04W 76/15; H04W 76/18; H04W 76/19; H04W 76/25; H04W 76/27; H04W 76/30; H04L 41/5012; H04L 67/322; H04L 41/5025; H04L 41/0654; H04L 41/5038
    See application file for complete search history.

(56) References Cited

U.S. PATENT DOCUMENTS

| | | | | |
|---|---|---|---|---|
| 2016/0330067 | A1* | 11/2016 | Liu | H04L 41/0654 |
| 2017/0012956 | A1 | 1/2017 | Lee et al. | |
| 2017/0238171 | A1* | 8/2017 | Huang | G06F 9/45558 |
| | | | | 455/424 |
| 2018/0013586 | A1* | 1/2018 | Wang | H04L 41/0886 |
| 2018/0101397 | A1* | 4/2018 | Sergeev | G06F 9/5077 |
| 2018/0309621 | A1* | 10/2018 | Yuan | H04L 29/08 |
| 2018/0376444 | A1* | 12/2018 | Kim | H04W 4/70 |
| 2019/0007992 | A1* | 1/2019 | Kim | H04W 76/27 |
| 2019/0053010 | A1* | 2/2019 | Edge | H04W 4/029 |
| 2019/0059067 | A1* | 2/2019 | Lee | H04W 60/04 |
| 2019/0075552 | A1* | 3/2019 | Yu | H04W 48/20 |
| 2019/0090123 | A1* | 3/2019 | Abraham | H04W 48/18 |
| 2019/0104458 | A1* | 4/2019 | Svennebring | H04W 76/27 |
| 2019/0251241 | A1* | 8/2019 | Bykampadi | H04L 9/3242 |
| 2019/0253894 | A1* | 8/2019 | Bykampadi | H04W 48/16 |
| 2019/0253912 | A1* | 8/2019 | Yao | H04W 24/10 |
| 2019/0306251 | A1* | 10/2019 | Talebi Fard | H04L 67/12 |
| 2019/0324813 | A1* | 10/2019 | Bogineni | G06F 9/5077 |
| 2020/0007632 | A1* | 1/2020 | Landais | H04L 67/16 |
| 2020/0146077 | A1* | 5/2020 | Li | H04W 76/10 |
| 2020/0178343 | A1* | 6/2020 | Kim | H04W 76/18 |

FOREIGN PATENT DOCUMENTS

| | | |
|---|---|---|
| WO | 2015110083 A1 | 7/2015 |
| WO | 2018183436 A1 | 10/2018 |

OTHER PUBLICATIONS

Author Unknown, "Technical Specification Group Services and System Aspects; Procedures for the 5G System; Stage 2 (Release 15)," Technical Specification 23.502, Version 15.3.0, 3GPP Organizational Partners, Sep. 2018, 330 pages.

Author Unknown, "Technical Specification Group Core Network and Terminals; 5G System; Restoration Procedures (Release 15)," Technical Specification 23.527, Version 15.0.0, 3GPP Organizational Partners, Sep. 2018, 16 pages.

Author Unknown, "Technical Specification Group Core Network and Terminals; 5G System; Access and Mobility Management Services; Stage 3 (Release 15)," Technical Specification 29.518, Version 15.1.0, 3GPP Organizational Partners, Sep. 2018, 173 pages.

Nokia, et al., "C4-187420: NF service restart detection by direct signalling between NFs," Third Generation Partnership Project (3GPP), TSG CT WG4 Meeting #86bis, Oct. 15-19, 2018, 3 pages, Vilnius, Lithuania.

International Search Report and Written Opinion for International Patent Application No. PCT/CN2018/115426, dated Aug. 13, 2019, 11 pages.

Ericsson, "C4-188124: Restart detection by direct signaling between NFs," 3GPP TSG CT WG4 Meeting #87, Nov. 26-30, 2018, West Palm Beach, US, 4 pages.

Supplementary European Search Report for European Patent Application No. 18917039.2, dated Feb. 26, 2020, 6 pages.

Examination Report for European Patent Application No. 18917039.2, dated Mar. 9, 2020, 5 pages.

* cited by examiner

NF SERVICE CONSUMER RESTART DETECTION USING DIRECT SIGNALING BETWEEN NFS

This application is a 35 U.S.C. § 371 national phase filing of International Application No. PCT/CN2018/115426, filed Nov. 14, 2018, the disclosure of which is incorporated herein by reference in its entirety.

TECHNICAL FIELD

The present disclosure relates to a cellular communications system and, in particular, to detecting a restart of a Network Function (NF) service consumer in a core network of a cellular communications system.

BACKGROUND

Third Generation Partnership Project (3GPP) Core Network and Terminals Working Group #4 (CT4) has created a new Technical Specification (TS) to specify Stage 2 requirements for a restoration procedure. At the last CT4 meeting, it was agreed to pass a Recovery Time stamp of a service producer in a Hyper Text Transfer Protocol (HTTP) response message (see, Change Request (CR) C4-187420). After incorporation of the changes proposed in this CR, 3GPP TS 23.527 V15.0.0 is revised to pass a Recovery Time stamp of a service producer in a HTTP response message as follows:

---

6              Restoration Procedures related to Service-Based Interfaces
6.1           General
A NF may detect a failure or a restart of a peer NF or NF service using the NRF as specified in subclause 6.2.
A NF may also detect a restart of a peer NF or NF service by receiving recovery time information in signalling exchanged with that peer NF or NF service.
The restoration procedures, initiated when detecting a failure or a restart are not specified in this release.
. . .
6.x           NF Service Restart Detection using direct signalling between NFs
6.x.1         General
This subclause describes an optional procedure that may be supported by NFs to detect the restart of a peer NF service using direct signalling between NFs.
6.x.2         NF Service Restart
FIG. 6.x.2-1 describes a NF Service restart scenario of an NF Service Producer and how the NF Service Consumer can detect this restart.
[reproduced in FIG. 1]
FIG. 6.x.2-1: NF Service Restart Detection

---

Figure 1:
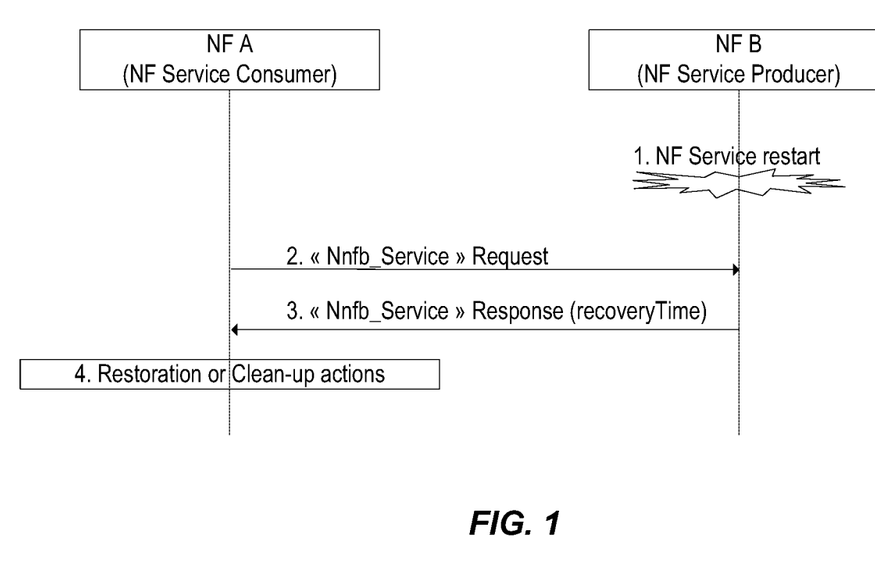
FIG. 1 illustrates a Network Function (NF) restart detection process for detecting a restart of a NF service producer.

1. A NF service produced by NF B restarts.
2-3. NF B service may include its last recovery timestamp in responses it sends to the NF Service Consumer, if the restart of the NF service resulted in losing contexts and e.g. if the NF service has restarted recently.
4. NF A may consider that all the resources created in the NF B service instance before the NF B service recovery time as have been lost. NF A triggers then appropriate restoration or clean-up actions.
The recovery timestamp signalled in direct signalling between NFs shall be associated to a NF service instance, i.e. the same recovery timestamp shall be signalled by a NF service instance whatever the NF service instance's endpoint addresses used for the signalling.

---

NOTE 1:
This procedure is only supported by NF services that support signalling the recoveryTime attribute.
NOTE 2:
The recovery time signalled in this procedure is equivalent to the recovery time of the NF service of FIG. 6.2.3-2. For an entire NF restart scenario, this procedure can be applied by each NF service instance of the NF.
NOTE 3:
This procedure enables the detection of a restart of a peer NF service when sending signalling towards that NF Service. It can fasten the detection of a restart of a peer NF service when frequent signalling occurs towards that peer NF Service.

---

SUMMARY

Systems and methods for detecting, e.g., that a Network Function (NF) service consumer in a core network of a cellular communications system has restarted are disclosed. In some embodiments, a method of operation of a NF service consumer in a core network of a cellular communications system comprises sending, to a NF service producer, a message comprising information related to a unit of the NF service consumer.

In some embodiments, the message is a request that invokes a NF service of the NF service producer.

In some embodiments, the information comprised in the message comprises information that identifies the unit of the NF service consumer. Further, in some embodiments, the information that identifies the unit of the NF service consumer is a Consumer ID of the NF service consumer.

In some embodiments, the information comprised in the message further comprises information that indicates a time at which the NF service consumer last performed a recovery. In some embodiments, the information that indicates a time at which the NF service consumer last performed a recovery is a timestamp.

In some embodiments, the information comprised in the message further comprises information that indicates a time at which the NF service consumer last performed a recovery and address information to contact the unit of the NF service consumer. In some embodiments, the address information comprises an Internet Protocol (IP) address or a Uniform Resource Indicator (URI).

In some embodiments, the recovery is a restart of the NF service producer.

In some embodiments, the method further comprises performing a restart of the NF service consumer. The method further comprises sending, to the NF service producer, a second message comprising second information that indicates a time at which the restart was performed as a new time at which the NF service consumer last performed a recovery.

Embodiments of a NF service consumer are also disclosed. In some embodiments, a NF service consumer for a core network of a cellular communications system is adapted to send, to a NF service producer, a message comprising information related to a unit of the NF service consumer. In some other embodiments, a network node implementing a NF service consumer for a core network of a cellular communications system comprises a network interface and processing circuitry associated with the network interface. The processing circuitry is configured to cause the network node to implement the NF service consumer wherein the NF service consumer is adapted to send, to a NF service producer, a message comprising information related to a unit of the NF service consumer.

Embodiments of a method of operation of a NF service producer in a core network of a cellular communications system are also disclosed. In some embodiments, a method of operation of a NF service producer in a core network of a cellular communications system comprises receiving, from a NF service consumer, a message comprising information related to a unit of the NF service consumer.

In some embodiments, the message is a request that invokes a NF service of the NF service producer.

In some embodiments, the information comprised in the message comprises information that identifies the unit of the NF service consumer. Further, in some embodiments, the information that identifies the unit of the NF service consumer is a Consumer ID of the NF service consumer.

In some embodiments, the information comprised in the message further comprises information that indicates a time at which the NF service consumer last performed a recovery. In some embodiments, the information that indicates a time at which the NF service consumer last performed a recovery is a timestamp.

In some embodiments, the information comprised in the message further comprises information that indicates a time at which the NF service consumer last performed a recovery and address information to contact the unit of the NF service consumer. In some embodiments, the address information comprises an IP address or URI.

In some embodiments, the recovery is a restart of the NF service producer.

In some embodiments, the method further comprises receiving, from the NF service consumer, a second message comprising second information that indicates a time at which the NF service consumer last performed a recovery. The method further comprises detecting that the NF service consumer has restarted based on a comparison of the information and the second information. In some embodiments, the information comprises a first timestamp and the second information comprises a second timestamp, and detecting that the NF service consumer has restarted comprises detecting that the second time stamp indicates a time that occurs after a time indicated by the first timestamp. In some embodiments, the method further comprises performing one or more actions upon detecting that the NF service consumer has performed a restart. In some embodiments, the one or more actions comprise one or more restoration and/or cleanup actions.

Embodiments of a NF service producer for a core network of a cellular communications system are also disclosed. In some embodiments, a NF service producer for a core network of a cellular communications system is adapted to receive, from a NF service consumer, a message comprising information related to a unit of the NF service consumer.

In some other embodiments, a network node implementing a NF service producer for a core network of a cellular communications system comprises a network interface and processing circuitry associated with the network interface. The processing circuitry is configured to cause the network node to implement the NF service producer wherein the NF service producer is adapted to receive, from a NF service consumer, a message comprising information related to a unit of the NF service consumer.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Core Network Entity:

As used herein, a core network entity is an entity in a core network. In other words, a core network entity is an entity that implements a function in the Evolved Packet Core (EPC) network (e.g., a Mobility Management Entity (MME), a Packet Data Network Gateway (P-GW), or the like) or a Network Function (NF) in the Fifth Generation Core (5GC) network (e.g., an Access and Mobility Management Function (AMF), a Session Management Function (SMF), a Policy Control Function (PCF), or the like). A core network entity may be implemented either as a network element on a dedicated hardware, as a software instance running on a dedicated hardware, or as a virtualized function instantiated on an appropriate platform, e.g., a cloud infrastructure.

Network Function Instance:

As used herein, a NF instance is an occurrence of a NF. For example, one type of NF is a SMF. A core network may include multiple SMFs, where each of these SMFs is referred to herein as a SMF instance.

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

As discussed above, it has been agreed in 3GPP to pass a Recovery Time stamp of a service producer in a Hyper Text Transfer Protocol (HTTP) response message (see, Change Request (CR) C4-187420). In 3GPP 5GC, the inventors believe that, at a NF service producer, it should also be possible to detect a NF service consumer has restarted and take appropriate actions. For example, a PCF may detect that a SMF has restarted and, in response, release PDU session policy associations associated with the SMF. As another example, a Base Station Function (BSF) can detect that a PCF has restarted and, in response, release binding information associated with the PCF.

Importantly, unlike the Internet where a server is not concerned with the lifecycle of a consumer and even more importantly will not associate different resources with the same context sharing lifecycle, 3GPP functionality often requires proactive restoration. That is, restoration of the Internet Protocol (IP) connectivity for a User Equipment (UE) in a timely manner is very important in some scenarios, e.g. for a voice Protocol Data Unit (PDU) session.

A 3GPP NF may be a service producer, and at the same time, it may be a service consumer for other services offered by other 3GPP NF. The software and/or hardware piece to support/offer a service (as a producer) may very well be different from the one to consume another service offered by other 3GPP NF, e.g. use different micro services, with different container. So, a service instance in a 3GPP NF may be restarted, but the other part, e.g. the piece of software and/or hardware for consuming a service may be still alive, and vice versa.

Furthermore, a NF may act as a pure service consumer without registration of a NF profile in the Network Repository Function (NRF). In this case, restart detection by direct signaling between NFs will be useful.

Systems and methods are disclosed herein for overcoming the aforementioned issues. In some embodiments, a new mechanism in provided in 5GC in which a NF acting as a NF service consumer includes information when transmitting a HTTP request towards a NF service producer to consume a NF service. This information includes a recovery time stamp for the NF service consumer, overload information, and/or load information. In addition, this information may include identification information that identifies the NF service consumer. In some embodiments, the identification information identifies a unit in the NF service consumer, which is particular software and/or hardware that is to consume the requested NF service. The identification information is sometimes referred to herein as a "consumer ID."

While not being limited to or by any particular advantage, embodiments described herein provide a number of advantages. For example, embodiments described herein enable specific information related to a service consumer, e.g. recovery time stamp, to be provided to a service producer to allow the service producer to detect a restart of a service consumer. In response to this detection, embodiments described herein enable the service producer to clean up resources if necessary and/or perform server-initiated end user service restoration (e.g., restoring UE IP connectivity). As another example, embodiments described herein enable specific information related to an overload information to be provided to a service producer. This enables the service producer to, e.g., perform overload control, e.g. reduce server initiated communication towards the consumer.

Figure 2:
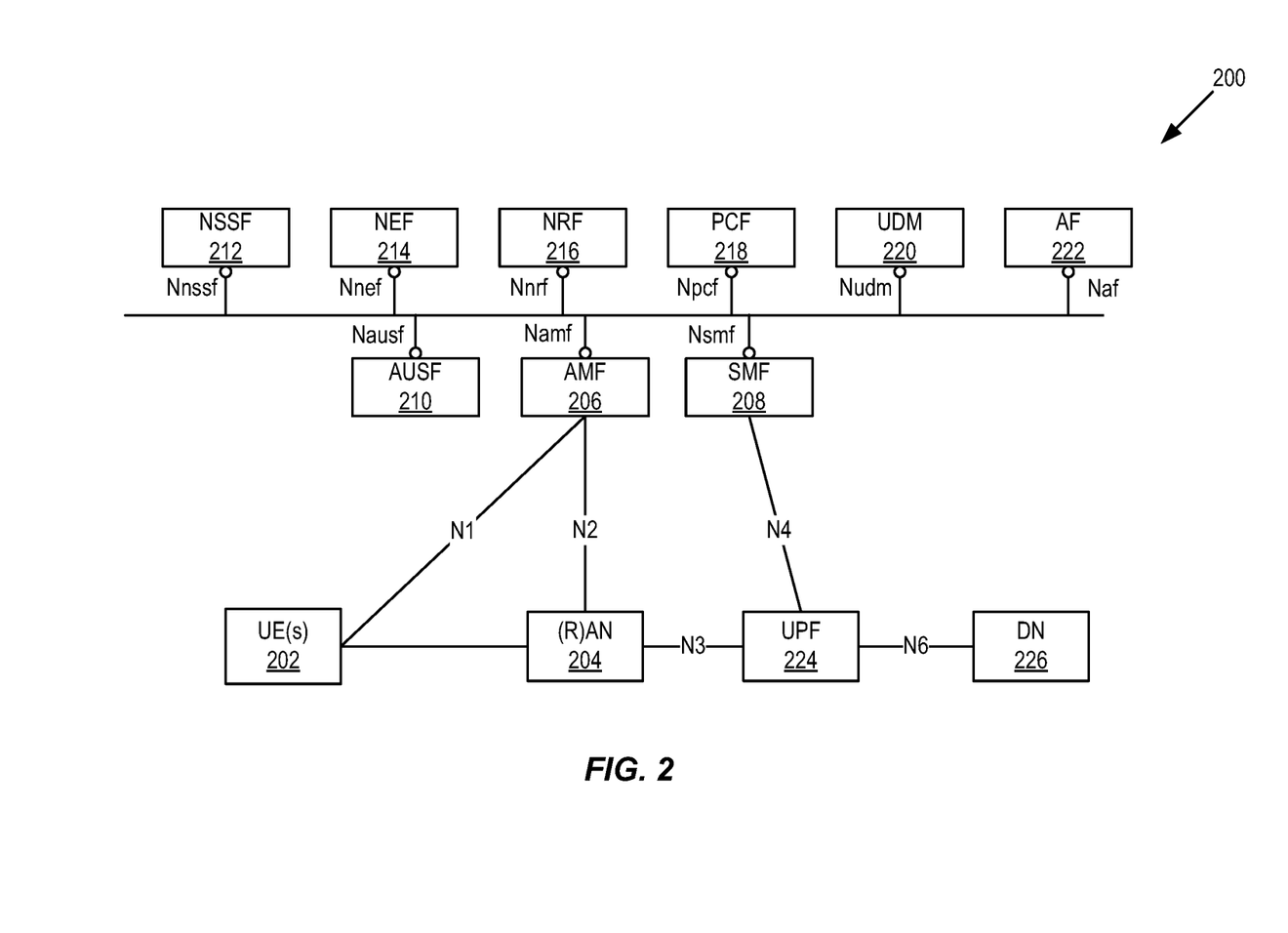
FIG. 2 illustrates one example of a cellular communications system according to some embodiments of the present disclosure.

In this regard, FIG. 2 illustrates one example of a cellular communications system 200 in which embodiments of the present disclosure may be implemented. In this particular example, the cellular communications system 200 is a Fifth Generation System (5GS). FIG. 2 illustrates the 5GS, and in particular the 5GC, using service-based interfaces between the NFs in the control plane. Seen from the access side, the cellular communications system 200 shown in FIG. 2 comprises a plurality of UEs 202 connected to a Fifth Generation (5G) Radio Access Network (RAN) 204, which may also be referred to as an Access Network (AN), as well as an AMF 206. Typically, the RAN 204 comprises base stations, e.g. such as 5G base stations (gNBs) or similar. Seen from the core network side, the 5GC includes a number of core NFs, which include a the AMF 206, a SMF 208, an Authentication Server Function (AUSF) 210, a Network Slice Selection Function (NSSF) 212, a Network Exposure Function (NEF) 214, a NRF 216, a PCF 218, a Unified Data Management (UDM) 220, and an Application Function (AF) 222. In the user plane, the 5GC includes a User Plane Function (UPF) 224 that connects the RAN 204 to a Data Network (DN) 226.

The service(s) etc. that a NF provides to other authorized NFs can be exposed to the authorized NFs through the service-based interface. In FIG. 2, the service based interfaces are indicated by the letter "N" followed by the name of the NF, e.g. Namf for the service based interface of the AMF 206 and Nsmf for the service based interface of the SMF 208, etc.

Some properties of the NFs shown in FIG. 2 may be described in the following manner. The AMF 206 provides UE-based authentication, authorization, mobility management, etc. A UE 202 even using multiple access technologies is basically connected to a single AMF 206 because the AMF 206 is independent of the access technologies. The SMF 208 is responsible for session management and allocates IP addresses to UEs 202. It also selects and controls the UPF 224 for data transfer. If a UE 202 has multiple sessions, different SMFs 208 may be allocated to each session to manage them individually and possibly provide different functionalities per session. The AF 222 provides information on the packet flow to the PCF 218 responsible for policy control in order to support Quality of Service (QoS). Based on the information, the PCF 218 determines policies about mobility and session management to make the AMF 206 and the SMF 208 operate properly. The AUSF 210 supports authentication function for UEs 202 or similar and thus stores data for authentication of UEs 202 or similar while the UDM 220 stores subscription data of the UE 202. The DN 226, not part of the 5GC, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 3:
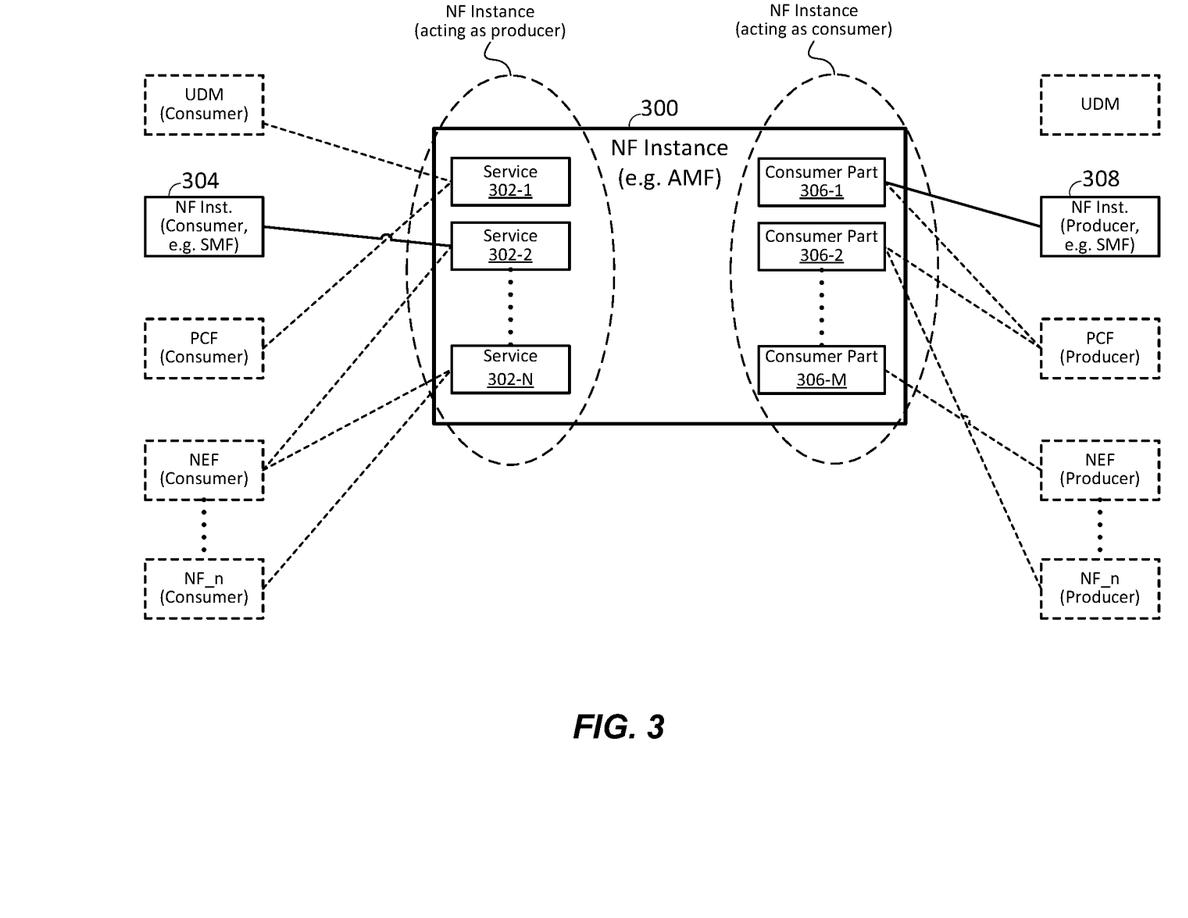
FIG. 3 illustrates one example of a NF instance that can operate as a NF service producer or a NF service consumer.

Additional details regarding some example embodiments of the present disclosure will now be provided. In this regard, FIG. 3 illustrates a NF instance 300 (e.g., an AMF instance) in accordance with some embodiments of the present disclosure. The NF instance 300 is identified by a NF instance Identifier (ID). The NF instance 300 can operate as a NF service producer and/or a NF service consumer. In this example, the NF instance 300 includes a number of services 302-1 through 302-N provided by the NF instance 300 when acting as a NF service producer. These services 302-1 through 302-N are consumed by a number of NF service consumers 304 (i.e., NFs acting as NF service consumers). For example, if the NF instance 300 is an AMF instance, the services 302-1 through 302-N may include, e.g., Namf-_Communication, Namf_EventExposure, Namf_MT, and Namf_Location to be consumed by the NF service consumers 304, where these different NF services are identified by different NF service instance IDs. Note that a NF may have multiple service instances for the same NF service.

The NF instance 300 in this example also includes a number of consumer parts 306-1 through 306-M that operate to consume NF service(s) offered by NF service producer(s) 308 when the NF instance 30 is acting as a NF service consumer.

Figure 4:
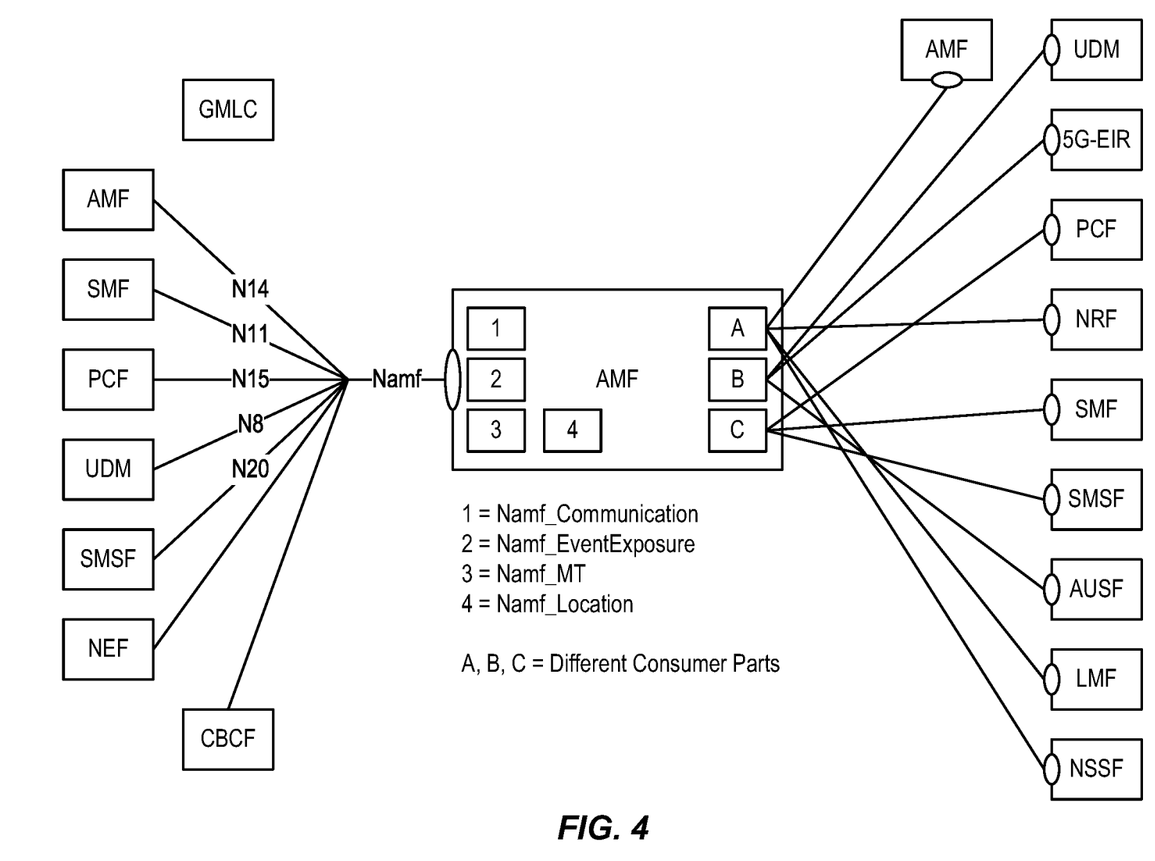
FIG. 4 illustrates one specific example of the NF instance of FIG. 3.

FIG. 4 illustrates a particular example in which the NF instance 300 is an AMF.

Figure 5:
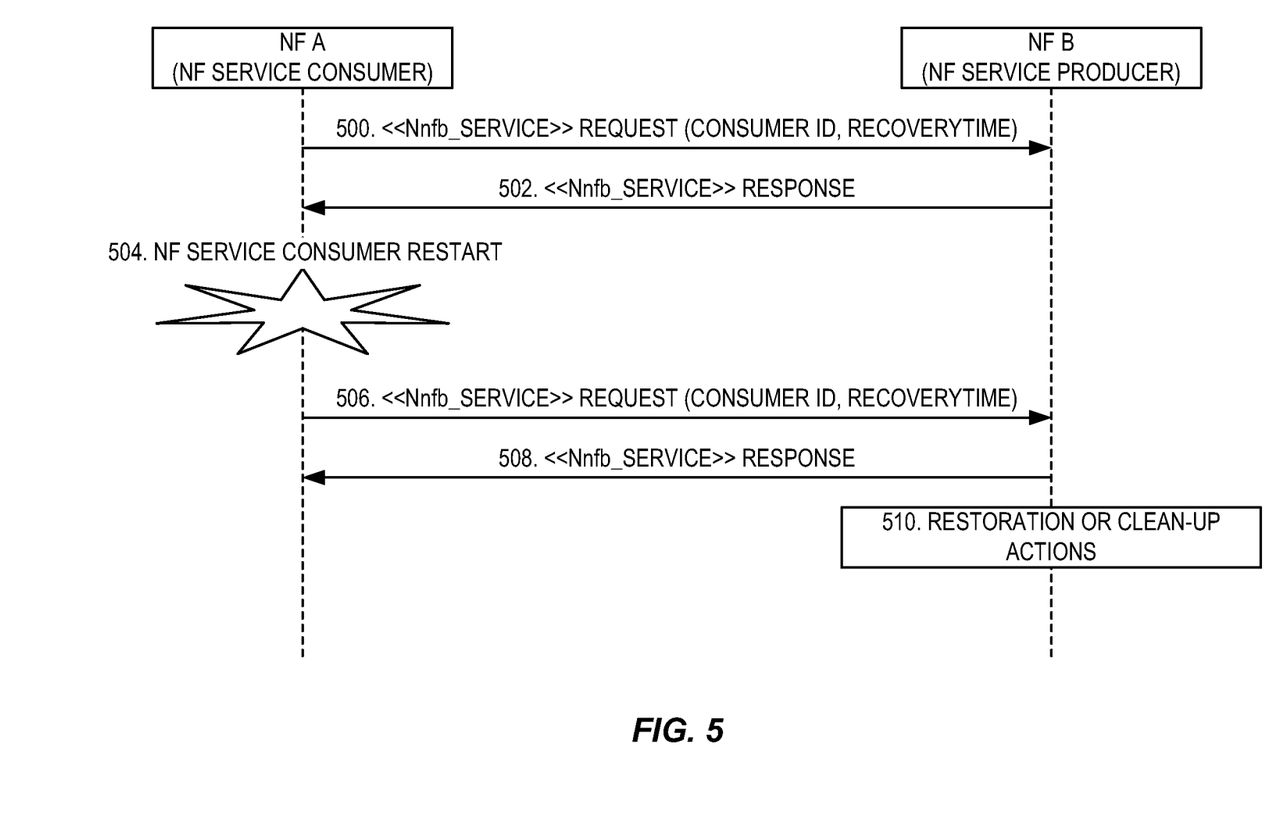
FIG. 5 illustrates the operation of a NF service consumer and a NF service producer to detect a restart of a NF service consumer in accordance with some embodiments of the present disclosure.

FIG. 5 illustrates the operation of two NF instances, NF instance A and NF instance B, in accordance with one example embodiment of the present disclosure. In this example, NF instance A is acting as a NF service consumer and, as such, is referred to herein as "NF service consumer." Likewise, in this example, NF instance B is acting as a NF service producer and, as such, is referred to herein as "NF service producer." Notably, in some embodiments, the NF instance acting as a NF service consumer may have a single "Consumer ID" and may be seen as a single "service consumer". However, in other embodiments, the NF instance may have multiple NF "service consumers" (e.g., multiple consumer parts) where each may have its own "Consumer ID" or all may use a common "Consumer ID", depending on the particular embodiment.

FIG. 5 shows the operation of the NF service producer and the NF service consumer upon restart of the NF service consumer. In particular, this process shows how the NF service producer can detect the restart of the NF service consumer. The steps of this process are as follows:

Step 500: The NF service consumer sends a request to the NF service producer to invoke a NF service provided by the NF service producer to create a certain resource. The request may include a Consumer ID of the NF service consumer (e.g., a Consumer ID of a particular consumer part 306 within the NF instance A) together with a last recovery timestamp. In addition, the request may include address information (e.g., an Internet Protocol (IP) address or a Uniform Resource Indictor (URI)) for this NF service consumer, associated with the Consumer ID. Preferably, the last recovery timestamp indicates a time at which the NF service consumer performed a recovery. However, the recovery timestamp may be any suitable timestamp indicating a suitable start-time, e.g. if there has not been any recovery the timestamp may indicate a start-time that, e.g., corresponds to the start/instantiation of NF instance A, or a start-time that corresponds to the time at which the request is/was sent. The Consumer ID is preferably identical for all service requests triggered by the NF service consumer for that service and is preferably globally unique (e.g., using a Universally Unique Identifier (UUID)).

Step 502: If resource creation is successful, the NF service producer may store the received Consumer ID and recovery timestamp and associate them with the created resource. The NF service producer may send an appropriate response to the NF service consumer.

Step 504: The NF service consumer restarts.

Step 506: The NF service consumer sends a request to the NF service producer, e.g., to invoke a NF service provided by the NF service producer. The service may be the same as the one requested in step 500 above, but it may alternatively be another service. The NF service consumer may include its last recovery timestamp together with its Consumer ID in the request. Preferably, the recovery timestamp is of the same or similar kind as the recovery timestamp mentioned in step 500. The same Consumer ID is used after restarting. In other words, the NF service consumer uses the same Consumer ID before and after restarting. In addition, the request in step 506 may include address information (e.g., a Uniform Resource Indictor (URI)) for this NF service consumer, associated with the Consumer ID.

Step 508: The NF service producer may compare the received recovery timestamp with the previous recovery timestamp associated with the Consumer ID. In this example, since the recovery timestamp received in the request of step 506 is different than (e.g. newer than) the previously stored recovery timestamp (received in the request of step 500) because the NF service consumer was restarted, the NF service producer detects that the NF service consumer was restarted. The NF service producer may send an appropriate response to the NF service consumer.

Step 510: The NF service producer may consider that the context in the NF service consumer corresponding to all the resources associated with the Consumer ID of the NF service consumer before the recovery time indicated in the recovery timestamp of step 508 as lost context in the NF service consumer. The NF service producer may trigger appropriate restoration or clean-up actions. In some embodiments, the address information associated with the Consumer ID may be used to perform the appropriate restoration or clean-up actions. A restoration may perhaps be some action that takes the restart into account before sending the 508 response, e.g. the response may perhaps include some history related to the service requested in step 500 that was lost by the NF consumer at the restart etc. A clean-up action may also be some action that takes the restart into account before sending the 508 response, e.g. the NF producer may perhaps reset some history related to the service requested in step 500 that is not relevant after the restart etc. Note that this procedure enables the detection of a restart of a peer NF service consumer when sending signaling towards that NF service producer. It is helpful if, e.g., the NF instance A is a pure service consumer without registration of its profile in NRF. If NF instance A does have a profile registered in NRF, it can also enable the detection of a restart of a peer NF service consumer when frequent signaling occurs towards that peer NF Service.

Note that, in addition or as an alternative to the recovery timestamp, the requests in steps 500 and 506 may include overload information or load information for the NF service consumer. The overload information may include an indication of whether the NF service consumer is experiencing or has experienced an overload condition. The load information includes information that indicates a current load condition of the NF service consumer (e.g., overloaded, low load, etc.). Upon receiving the overload information or the load information, the NF service producer may, e.g., perform one or more actions that take into account the overload information or the load information (e.g., stop, pause, or reduce the sending of responses (e.g., such as in step 508) to the NF).

Figure 6:
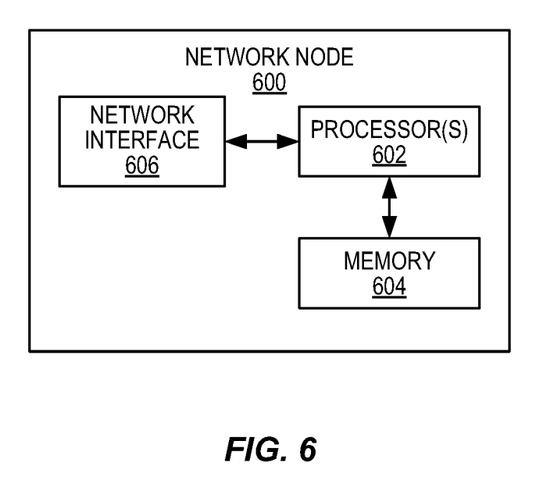
FIG. 6 is a schematic block diagram of a node implementing a core NF according to some embodiments of the present disclosure.

FIG. 6 is a schematic block diagram of a network node 600 according to some embodiments of the present disclosure. The network node 600 is a network node that implements one or more core network functions in accordance with any of the embodiments disclosed herein. For example, the network node 600 may implement as network function such as the network function instance 300 of FIG. 3, the NF service consumer of FIG. 5, or the NF service producer of FIG. 5. As illustrated, the network node 600 includes one or more processors 602 (e.g., Central Processing Unit (CPUs), Application Specific Integrated Circuits (ASICs), Field Programmable Gate Arrays (FPGAs), and/or the like), memory 604, and a network interface 606. The one or more processors 602 are also referred to herein as processing circuitry. The one or more processors 602 operate to provide one or more functions of core network function as described herein. In some embodiments, the function(s) are implemented in software that is stored, e.g., in the memory 604 and executed by the one or more processors 602.

Figure 7:
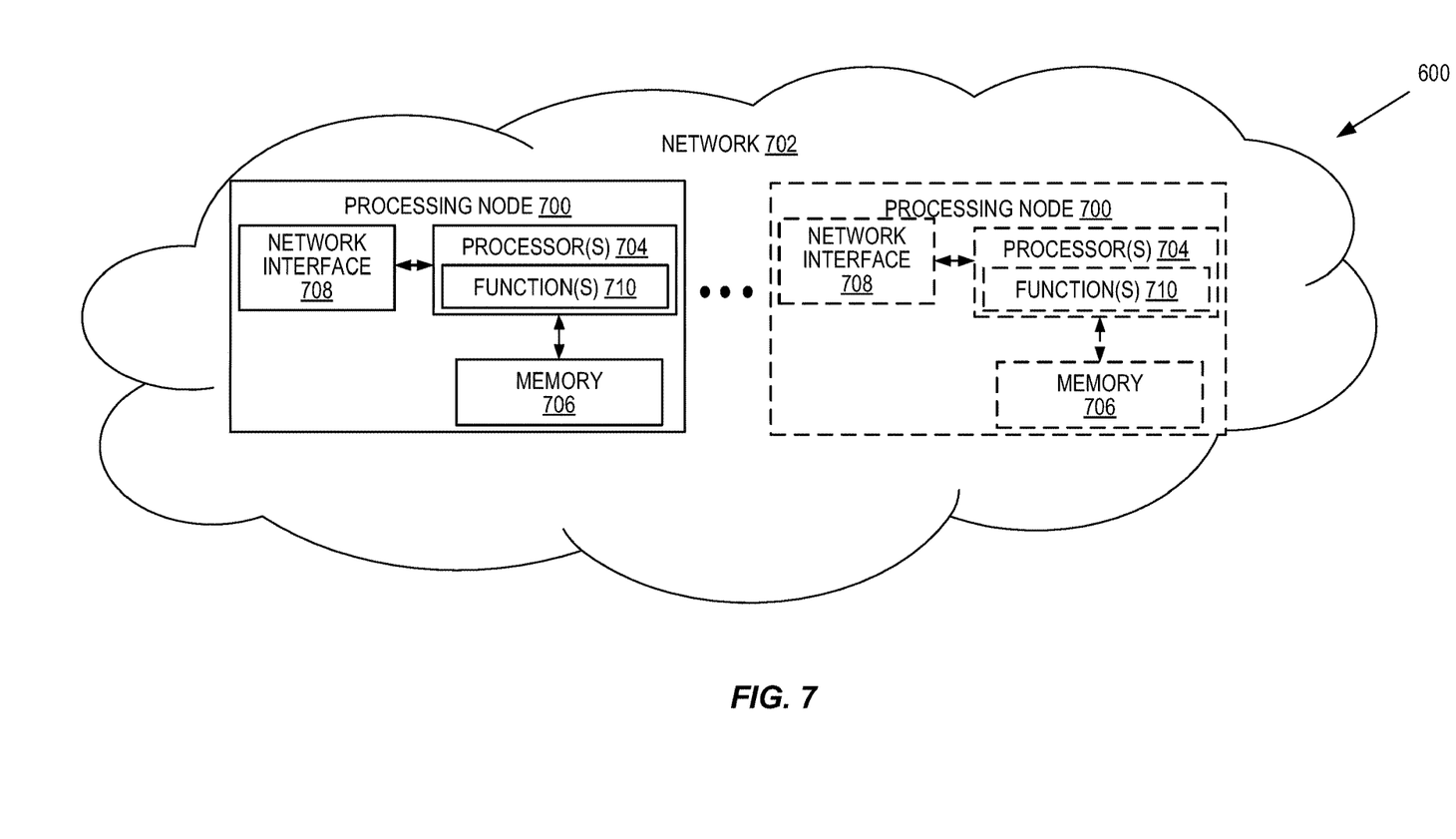
FIG. 7 is a schematic block diagram that illustrates a virtualized embodiment of a core NF according to some embodiments of the present disclosure.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the network node 600 (e.g., the functions of the core network function(s)) described herein are implemented at the one or more processing nodes 700 or distributed across the one or more processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, causes the at least one processor to carry out the functionality of network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
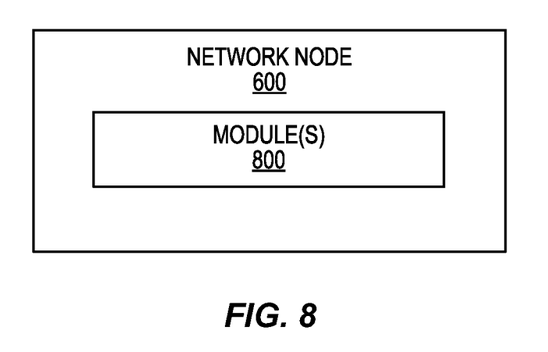
FIG. 8 is a schematic block diagram of the node implementing a core NF according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein and, in particular, the functionality of the core network function(s) described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
ASIC Application Specific Integrated Circuit
AUSF Authentication Server Function
BSF Base Station Function
CPU Central Processing Unit
CR Change Request
CT4 Core Network and Terminals Working Group #4
DN Data Network
DSP Digital Signal Processor
EPC Evolved Packet Core
FPGA Field Programmable Gate Array
gNB 5G Base Station
ID Identifier
IP Internet Protocol
HTTP Hyper Text Transfer Protocol
MME Mobility Management Entity
NEF Network Exposure Function
NF Network Function
NRF Network Repository Function
NSSF Network Slice Selection Function
PCF Policy Control Function
PDU Protocol Data Unit
P-GW Packet Data Network Gateway
QoS Quality of Service
RAM Random Access Memory
RAN Radio Access Network
ROM Read Only Memory
SMF Session Management Function
TS Technical Specification
UDM Unified Data Management
UE User Equipment
UPF User Plane Function
UUID Universally Unique Identifier Those skilled in the art will recognize improvements and modifications to the embodiments of the present disclosure.

All such improvements and modifications are considered within the scope of the concepts disclosed herein.

What is claimed is:

1. A method of operation of a Network Function, NF, service consumer in a core network of a cellular communications system, comprising:
sending, to an NF service producer, a first request message to invoke an NF service provided by the NF service producer to create a resource in the NF service producer, which first request message comprises a Consumer ID of the NF service consumer and first information that indicates a time at which the NF service consumer last performed a recovery;
performing a restart of the NF service consumer; and then
sending, to the NF service producer, a second request message to invoke a same NF service as requested in the first request message, which second request message comprises the Consumer ID and second information that indicates a time at which the restart was performed, which new time is newer than the time indicated by the first request message.

2. The method of claim 1 wherein the first information that indicates the time at which the NF service consumer last performed the recovery is a timestamp.

3. The method of claim 1 wherein the first information comprised in the first request message further comprises address information to contact a unit of the NF service consumer.

4. The method of claim 3 wherein the address information comprises an Internet Protocol, IP, address or a Uniform Resource Indicator, URI.

5. The method of claim 1 wherein the recovery is the restart of the NF service consumer.

6. The method of claim 1 further comprising:
receiving, from the NF service producer, a response indicating that the resource creation was successful.

7. The method of claim 1 wherein the information that indicates the time at which the NF service consumer last performed the recovery is a start time indicating a start of the NF service consumer.

8. A network node implementing a Network Function, NF, service consumer for a core network of a cellular communications system, comprising:
a network interface; and
processing circuitry associated with the network interface, the processing circuitry configured to cause the network node to implement the NF service consumer wherein the NF service consumer is adapted to:
send, to an NF service producer, a first request message to invoke an NF service provided by the NF service producer to create a resource in the NF service producer, which first request comprises a Consumer ID of the NF service consumer and first information that indicates a time at which the NF service consumer last performed a recovery;
performing a restart of the NF service consumer; and then
sending, to the NF service producer, a second request message to invoke a same NF service as requested in the first request message, which second request message comprises the Consumer ID and second information that indicates a time at which the restart was performed, which new time is newer than the time indicated by the first request message.

9. A method of operation of a Network Function, NF, service producer in a core network of a cellular communications system, comprising:
receiving, from an NF service consumer, a first request message to invoke an NF service provided by the NF service producer to create a resource in the NF service producer, which first request message comprises a Consumer ID of the NF service consumer and first information that indicates a time at which the NF service consumer last performed a recovery;
receiving, from the NF service consumer, a second request message comprising second information that indicates the time at which the NF service consumer last performed the recovery; and
detecting that the NF service consumer has restarted based on a comparison of the first information and the second information.

10. The method of claim 9 wherein the first information that indicates the time at which the NF service consumer last performed the recovery is a timestamp.

11. The method of claim 10 wherein the NF service producer stores the received Consumer ID and the recovery timestamp and associates them with the created resource when the resource creation was successful.

12. The method of claim 9 wherein the first information comprised in the request message further comprises address information to contact a unit of the NF service consumer.

13. The method of claim 12 wherein the address information comprises an Internet Protocol, IP, address or a Uniform Resource Indicator, URI.

14. The method of claim 9 wherein the recovery is the restart of the NF service producer.

15. The method of claim 9 wherein the first information comprises a first timestamp and the second information comprises a second timestamp, and detecting that the NF service consumer has restarted comprises detecting that the second timestamp indicates a time that occurs after a time indicated by the first timestamp.

16. The method of claim 9 further comprising performing one or more actions upon detecting that the NF service consumer has performed the restart.

17. The method of claim 16 wherein the one or more actions comprise one or more restoration and/or clean-up actions.

18. The method of claim 9 further comprising:
sending, to the NF service consumer, a response indicating that the resource creation was successful.

19. The method of claim 9 wherein the information that indicates the time at which the NF service consumer last performed the recovery is a start time indicating a start of the NF service consumer.

20. A network node implementing a Network Function, NF, service producer for a core network of a cellular communications system, comprising:
a network interface; and
processing circuitry associated with the network interface, the processing circuitry configured to cause the network node to implement the NF service producer wherein the NF service producer is adapted to:
receive, from an NF service consumer, a first request message to invoke an NF service provided by the NF service producer to create a resource in the NF service producer, which request comprises a Consumer ID of the NF service consumer and first information that indicates a time at which the NF service consumer last performed a recovery;
receive, from the NF service consumer, a second request message comprising second information that indicates the time at which the NF service consumer last performed the recovery; and detect that the NF service consumer has restarted based on a comparison of the first information and the second information.

\* \* \* \* \*

UNITED STATES PATENT AND TRADEMARK OFFICE
CERTIFICATE OF CORRECTION

PATENT NO. : 10,862,770 B2  Page 1 of 1
APPLICATION NO. : 16/345153
DATED : December 8, 2020
INVENTOR(S) : Lu et al.

It is certified that error appears in the above-identified patent and that said Letters Patent is hereby corrected as shown below:

In the Specification

In Column 6, Line 19, delete "include a the" and insert -- include the --, therefor.

In Column 7, Line 46, delete "Resource Indictor" and insert -- Resource Indicator --, therefor.

In Column 8, Line 10, delete "Resource Indictor" and insert -- Resource Indicator --, therefor.

In Column 9, Line 4, delete "Central Processing Unit (CPUs)," and insert -- Central Processing Units (CPUs), --, therefor.

In Column 10, Line 14, delete "functions according one" and insert -- functions according to one --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*